United States Patent [19]
Burnett

[11] 3,724,616
[45] Apr. 3, 1973

[54] TANDEM CYLINDER DISC BRAKE
[75] Inventor: Richard T. Burnett, South Bend, Ind.
[73] Assignee: The Bendix Corporation, South Bend, Ind.
[22] Filed: Apr. 22, 1971
[21] Appl. No.: 136,470

[52] U.S. Cl. ............................. 188/345, 60/54.6 M
[51] Int. Cl. ............................................. B60t 11/20
[58] Field of Search ......... 188/106 P, 345; 60/54.6 M

[56] References Cited

UNITED STATES PATENTS

| | | | |
|---|---|---|---|
| 3,472,344 | 10/1969 | Bruin et al. | 188/106 P X |
| 3,477,549 | 11/1969 | Barton | 188/345 |
| 3,486,591 | 12/1969 | Scheffler | 188/345 X |
| 3,576,236 | 4/1971 | Laverdant | 188/345 |

FOREIGN PATENTS OR APPLICATIONS

| 424,193 | 2/1935 | Great Britain | 60/54.6 M |
|---|---|---|---|

Primary Examiner—George E. A. Halvosa
Attorney—Ken C. Decker and Plante, Hartz, Smith & Thompson

[57] ABSTRACT

A tandem cylinder caliper disc brake is disclosed which includes a two-piece caliper housing. The main portion of the caliper includes a housing which defines the usual bore therewithin in which the actuating piston of the brake is adapted to reciprocate. The second portion of the caliper is a plug which is secured to the main portion by suitable fastening means and which cooperate with the wall of the bore to define an annular chamber therebetween. The actuating piston includes an annular section and a transversely extending section which closes one end of the annular section. The annular section is slidably received within the annular chamber defined between the plug and the walls of the bore. A first chamber defined between the end of the annular section and the corresponding end of the bore is communicated to a first vehicle hydraulic system, and a second chamber defined between the transversely extending portion of the piston and the end of the plug is communicated to a second vehicle hydraulic system. A pair of axially spaced seals carried by the plug engage the inner circumferential surface of the annular section of the piston. A pair of spaced static seals are disposed between the plug and the main portion of the caliper. Vents are provided to communicate the portion of the interface between the plug and the piston between the two dynamic seals and the portion of the interface between the plug and the main portion of the caliper between the two static seals to the exterior of the caliper.

2 Claims, 4 Drawing Figures

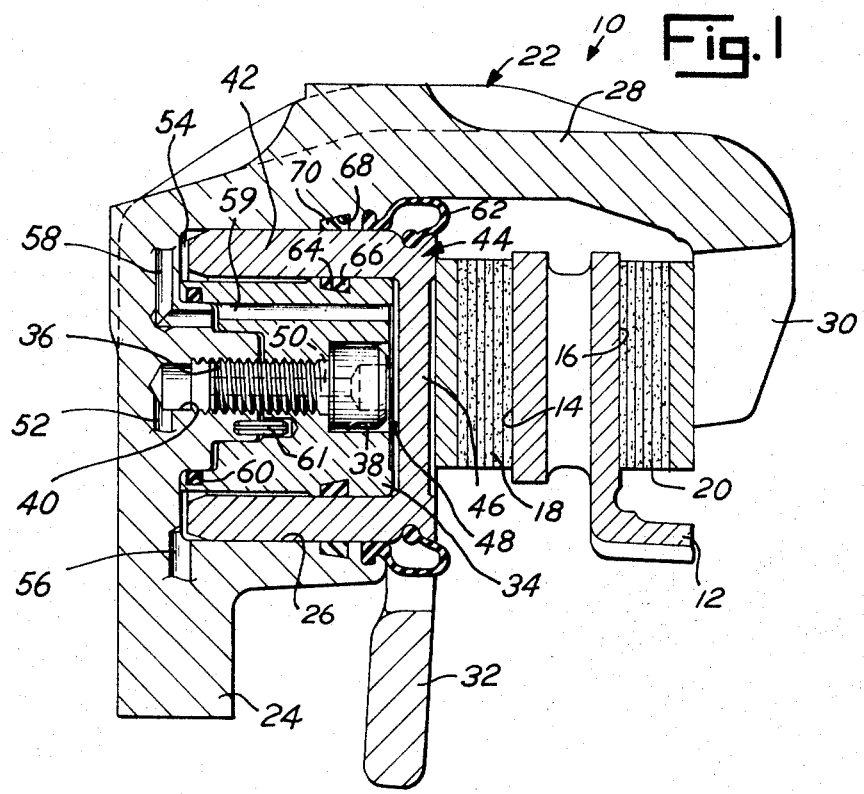
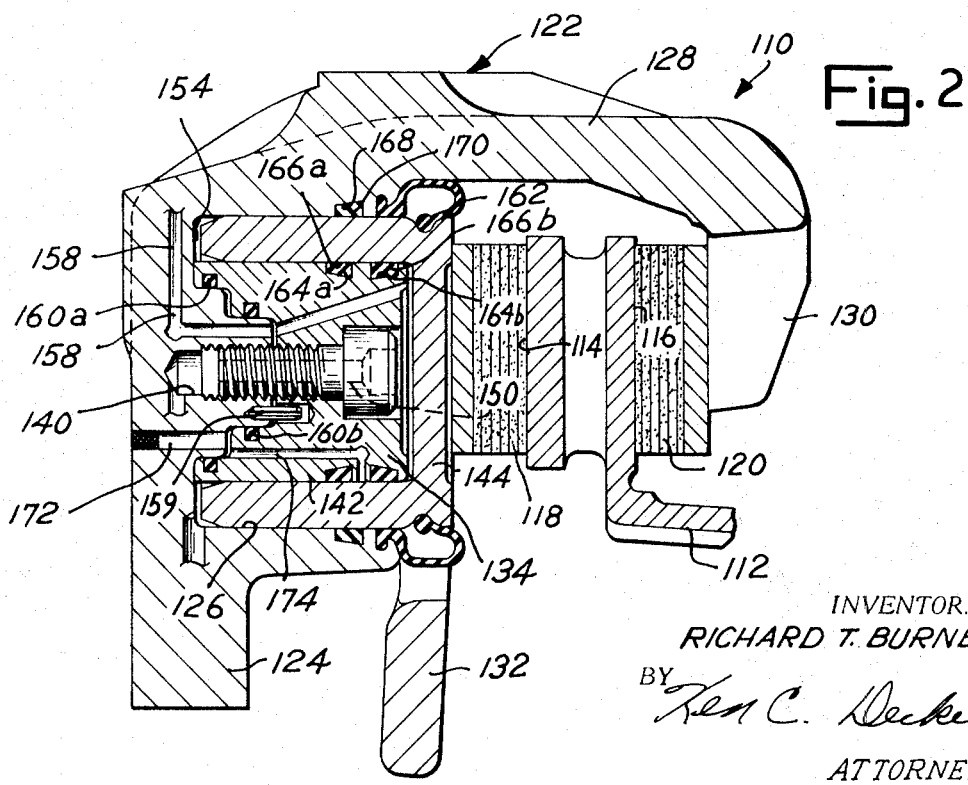

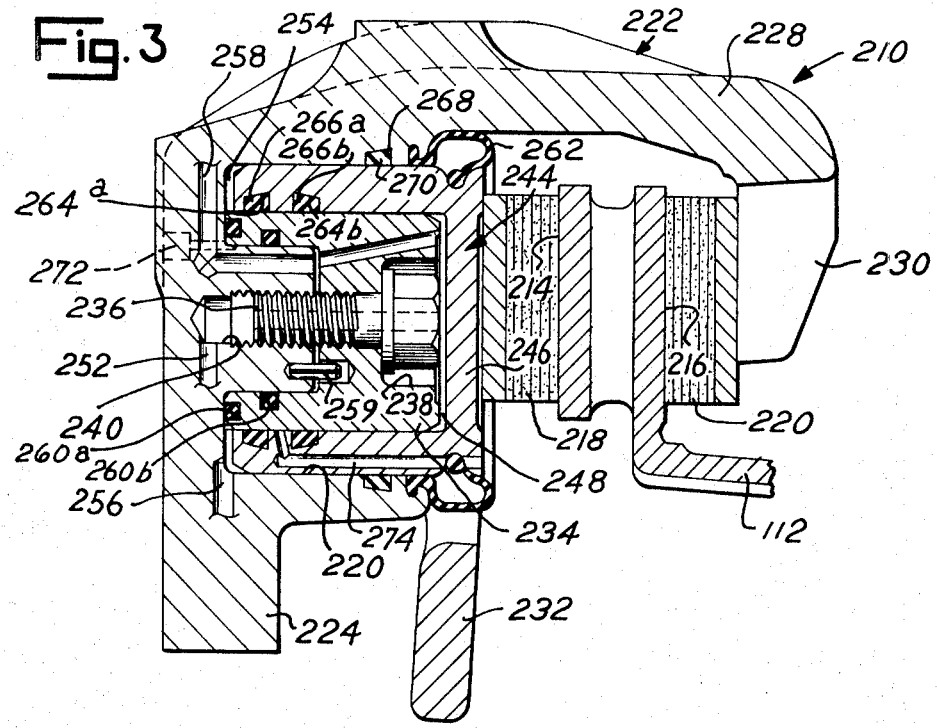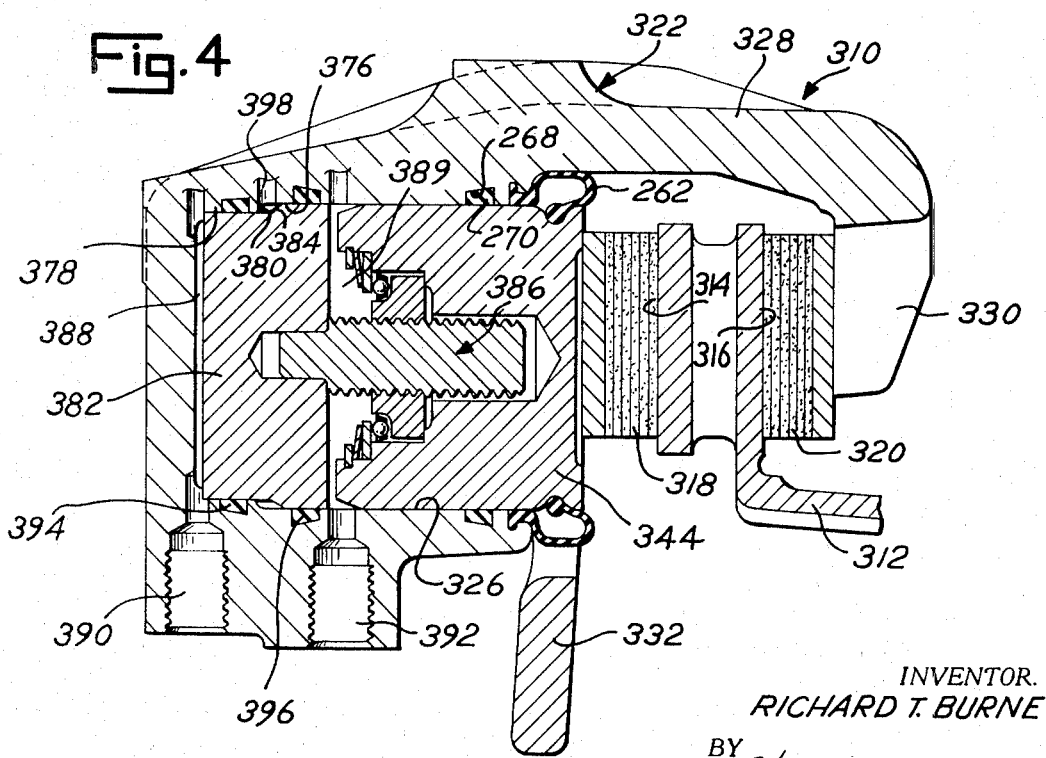

3,724,616

TANDEM CYLINDER DISC BRAKE

BACKGROUND OF THE INVENTION

This invention relates to a tandem cylinder caliper disc brake.

It has been desirable and, more recently required by law, to have the brake applying hydraulic system of an automotive vehicle divided into two or more sections so that a single failure, such as a hydraulic leak, will not render all of the vehicle's brakes inoperative. This has usually been done by having the front wheel brakes in one system and the rear wheel brakes in another system. However, recently published proposed federal safety standards require that the vehicle be able to stop, upon failure of one of the hydraulic systems, in a distance which cannot be met by the rear brakes alone on many vehicles because of insufficient weight on the rear axle, which results in rear wheel slide. Therefore, it is necessary to have "split" front brakes in which at least a portion of each front brake can be used in conjunction with one or more rear brakes. In some commercial vehicles, split rear brakes may be required.

Although brakes of this type have been proposed before, they have usually been quite difficult to manufacture. For example, one design provides a caliper housing which slidably receives an annular portion of the actuating piston in a rather narrow annular chamber within the caliper. However, the annular chamber is so narrow that it is often difficult, if not impossible, to machine grooves in the walls of the annular chamber which support the necessary seals to prevent fluid communication from one hydraulic system to the other. Another difficulty with this design is that opposite sides of a single seal are exposed to fluid pressures from different hydraulic systems, so that a seal failure would be undetected and would also permit communication of hydraulic fluid from one of the hydraulic systems to the other system, thereby defeating the purpose of splitting the systems.

SUMMARY OF THE INVENTION

Therefore, an important object of this invention is to provide a tandem cylinder caliper disc brake which is substantially easier to manufacture than similar disc brakes known in the prior art.

Another important object of my invention is to prevent fluid communication between the two hydraulic systems used to actuate tandem cylinder disc brakes even if one of the seals which engage the piston fails.

Another important object of my invention is to provide a tandem cylinder disc brake having a pair of axially spaced dynamic seals which slidably engage the piston, and to vent the interface between the piston and the caliper between the spaced dynamic seals to the exterior of the vehicle, to thereby prevent fluid communication between the two hydraulic actuating systems even if one of the seals fail.

A still further object of my invention is to provide a tandem cylinder disc brake having a two-piece caliper including a main body portion defining a chamber therewithin and a plug which is installed in the chamber after suitable seal receiving grooves are machined on the plug.

A still further important object of my invention is to provide a tandem cylinder disc brake having a pair of spaced static seals between the plug and the main body portion of the caliper and to vent the interface between the plug and the main portion of the caliper between the static seal to the exterior of the brake.

DESCRIPTION OF THE DRAWINGS

FIG. 1 is a cross-sectional view of a tandem cylinder caliper disc brake made pursuant to the teachings of my present invention;

FIG. 2 is a cross-sectional view similar to FIG. 1 but illustrating a first alternate embodiment of my invention;

FIG. 3 is a view similar to FIGS. 1 and 2, but illustrating a second alternate embodiment of my invention; and FIG. 4 is a view similar to FIGS. 1, 2, and 3, but illustrating a third alternate embodiment of my invention.

DETAILED DESCRIPTION OF THE PREFERRED EMBODIMENT

Referring now to FIG. 1, a disc brake generally indicated by the numeral 10 includes a rotor 12 having a pair of friction faces 14 and 16. A pair of friction elements 18, 20 are disposed adjacent corresponding friction faces 14 and 16 respectively, and are adapted to be urged into braking engagement with the latter by a caliper generally indicated by the numeral 22. The caliper 22 includes a main body housing 24 which defines a bore 26 therewithin which is disposed adjacent the friction element 18. Caliper 22 further includes a bridge portion 28 which extends across the periphery of the rotor 12 and an inwardly extending portion 30 which is adapted to engage the friction element 20. A torque member 32 is rigidly secured to a portion of the vehicle and slidably supports the caliper 22 which may be connected to the torque member 32 by any well-known method, such as the one disclosed in U. S. Pat. No. 3,388,774 owned by the assignee of the present invention and incorporated herein by reference.

Caliper 22 further includes a plug 34 which is releasably secured in the bore 26 by an appropriate fastening means, such as by the bolt 36. The plug 34 is counterbored as at 38 to receive the head of the bolt 36. The threaded end of the bolt 36 engages corresponding threads provided in a counterbore 40 in the housing 24. The outer circumferential surface of the plug 34 cooperates with the wall of the bore 26 to define an annular chamber therebetween, which slidably receives an annular section 42 of an actuating piston generally indicated by the numeral 44. Piston 44 further includes a transversely extending section 46 which closes one end of the annular section 42. The outer side of the transversely extending section 46 of piston 44 is adapted to engage the friction element 18 for urging the latter toward the friction face 14 when a brake application is effected. The inner side of the transversely extending section 46 cooperates with the end of the plug 34 to define a variable-volume chamber 48 therebetween. The chamber 48 is communicated with one of the vehicle's hydraulic brake actuating systems by passage means which includes a passage 50 extending through the bolt 36, the counterbore 40 and another passage 52 which communicates the counterbore 40 with an inlet port on the exterior of the caliper 22. Similarly, the end of the annular section 42 cooperates with the end of the bore 26 to define another variablelvolume chamber 54. The chamber 54 is communicated to a second vehicle hydraulic brake actuating system by a passage 56. Suitable bleed passages 58 and 59 within the housing and the plug, respectively, permit egress of air from the chamber 48 when the latter is initially charged with fluid. A suitable device such as roll pin 61 orients the plug 34 so that the bleed passage 59 communicates with the passage 58.

A static seal 60 is carried by the plug 34 for sealing engagement with the housing 24 to prevent fluid communication through the interface between the plug and the housing. A boot 62 is also provided to prevent contaminants from the exterior of the brake from damaging the wall of the bore 26. The outer circumferential surface of the plug 34 is provided with a groove 64 which receives a suitable dynamic seal 66 which slidingly and sealingly engages the inner circumferential surface of the annular section 42 of piston 44. Similarly, the wall of the bore 26 is provided with a circumferentially extending groove 68 which supports a seal 70 which slidingly and sealingly engages the outer circumferential surface of the annular section 42. In prior art disc brakes, it was often difficult if not impossible to machine the wall of the bore 26, the outer circumferential surface of the member corresponding to plug 34, and to machine the grooves 68 and 64 in their proper places, because the width of the annular chamber which receives the annular section of piston 42 was so small. However, in the present device, an appropriate tool may be inserted into the bore 26 from the open end of the latter to machine the walls of the bore. Similarly, the groove 68 may be cut in the bore 26 before the plug 34 is installed. The outer circumferential surface of the plug 34 may be machined and the groove 64 cut in the latter before the plug 34 is installed within the housing 24. As can be seen by those skilled in the art, by providing a two-piece caliper consisting of the main housing 24 and the plug 34, machining and assembly of the caliper 22 is considerably simplified.

In operation, when the vehicle operator depresses the brake pedal, thereby developing pressure in the vehicle's master cylinder (not shown), fluid pressure is delivered from the master cylinder to the chamber 48 through a first hydraulic system and from the master cylinder to the chamber 54 through a second hydraulic system. Fluid pressure in the chambers 48 and 54 urge the pistons 44 to the right viewing FIG. 1 thereby urging the friction element 18 into braking engagement with the friction face 14. Since the caliper 22 is slidably mounted on the torque member 32, reaction forces acting through the bridge portion 28 and the inwardly extending portion 30 also urge the friction element 20 into engagement with the friction face 16. Should one of the vehicle's hydraulic systems fail, thereby failing to pressurize one of the chambers 54 or 48, sufficient pressure will be developed to actuate the brake.

DETAILED DESCRIPTION OF THE FIRST AND SECOND ALTERNATE EMBODIMENTS

In the first alternate embodiment illustrated in FIG. 2, elements the same or substantially the same as those in the preferred embodiment retain the same reference numerals, but are preceded by the numeral 1. Similarly, in the second alternate embodiment illustrated in FIG. 3, elements substantially the same as those in the preferred embodiment retain the same reference character, but are preceded by the numeral 2. As will be appreciated by those skilled in the art, opposite sides of the dynamic seal 66 in FIG. 1 are exposed to pressures in the chambers 54 and 48, respectively. Therefore, if the seal 66 should fail, fluid pressure in one of the chambers 54 or 48 will be communicated to the other chamber and into the other vehicle hydraulic system, thus defeating the purpose of providing a split system brake in that a failure in one of the hydraulic systems would also cause a failure in the other hydraulic system. Similarly, opposite sides of the static seal 60 in FIG. 1 are exposed to pressure of different hydraulic systems so that, if the seal 60 should fail, fluid from one of the systems would also be communicated to the other system. However, in the embodiment of FIG. 2, the single seal 66 of the FIG. 1 embodiment is replaced by a pair of axially spaced seals 166a and 166b, each of which sealingly and slidingly engage the inner circumferential surface of the piston 144. Similarly, the static seal 6 of the embodiment of FIG. 1 is replaced by a pair of seals 160a and 160b. That portion of the interface between the plug 134 and the housing 124 between seals 160a and 160b is communicated to the exterior of the brake housing by a vent passage 172 which extends through the housing 24. Similarly, that portion of the interface between the outer circumferential surface of the plug 134 and the inner circumferential surface of the annular section 142 of piston 144 between the seals 166a and 166b is also vented to the exterior of the brake through a vent passage 174 and the vent passage 172. Therefore, if one of the seals 166a or 166b should fail, fluid from the corresponding hydraulic system leaking past the failed seal will be communicated to the exterior of the vehicle while the other hydraulic system remains sealed by the other seal. Upon failure of one of the seals 160a or 160b, fluid pressure from the corresponding system will also be communicated to the exterior of the vehicle, leaving the other seal, and therefore, the other hydraulic system, operable. The embodiment of FIG. 3 is essentially the same as the embodiment of FIG. 2, except that the seals 266a and 266b are carried in grooves 264a and 264b provided in the piston 244 instead of in the plug 234. The appropriate vent 274 which communicates the portion of the interface between the plug and the piston extending between the seals 266a and 266b is formed within the piston 244 instead of within the plug 234. A second passage 272 is also provided which communicates the interface between the plug 234 and housing 224 extending between the seals 260a and 260b to the exterior of the vehicle.

DETAILED DESCRIPTION OF THE THIRD ALTERNATE EMBODIMENT

In the embodiment of FIG. 4, elements substantially the same as those in the embodiment of FIG. 1 retain the same reference character, but are preceded by the numeral 3. In the embodiment of FIG. 4, the bore 326 is stepped to prevent larger and smaller diameter sections 376 and 378, respectively, with a shoulder 380 therebetween. A stepped piston 382 has larger and smaller diameter portions slidably received in the larger and smaller diameter portions of the bore respectively, which present a shoulder 384 therebetween. An automatic adjuster generally indicated by the reference numeral 386 interconnects the pistons 382 and 344. The automatic adjuster may be of the type more completely disclosed in U. S. patent application Ser. No. 863,482, filed Oct. 3, 1969, owned by the assignee of the present invention and incorporated herein by reference. The smaller diameter end of the piston 382 cooperates with the end of the bore 326 to define a first variable volume chamber 388 therebetween which is communicated with one of the vehicle's brake hydraulic systems by a passage 390. The variable-volume chamber 389 defined between the pistons 382 and 344 is communicated to the other brake hydraulic system by the passage 392. First and second axially spaced dynamic seals 394 and 396 slidingly and sealingly engage the smaller and larger diameter portions of the piston 382 respectively. A vent passage 398 communicates the chamber defined between the shoulders 380 and 384 to the exterior of the vehicle. In operation, when a brake application is effected with both of the vehicle brake hydraulic systems operative, fluid pressure developed in the master cylinder will be communicated into the chambers 388 and 389 respectively. However, since the fluid pressure in chamber 389 acts across the larger face of the piston 382, the latter will remain in its rearwardmost position while the piston 344 is urged to the right viewing FIG. 4, thereby effecting a brake application in the normal manner. If the movement required of piston 344 to actuate the vehilcle's brakes exceeds the predetermined amount, the automatic adjuster 386 limits retraction of the piston when the brake is released to the predetermined amount, thereby maintaining the proper clearance between the friction elements and their corresponding friction faces. If the hydraulic system communicated to the chamber 389 should leak, fluid pressure in the chamber 388 will be sufficient to actuate the brake. Similarly, if the vehicle hydraulic brake system communicated to the chamber 388 should leak, pressure in chamber 389 will actuate the brake in the normal manner. If one of the seals 394 or 396 should fail, pressure from the effected chamber 388 or 389 leaking past the corresponding seal will be communicated to exterior of the brake through the vent passage 398, thereby permitting the other seal to maintain pressure in the other chamber for actuating the brake.

I claim:

1. In a disc brake:

a rotor having a pair of friction faces;

a pair of friction elements, one of said elements being disposed adjacent each of said friction faces;

a torque member;

a caliper slidably mounted on said torque member straddling said rotor and operatively connected to each of said friction elements for urging the latter into braking engagement with their corresponding friction faces when a brake application is effected;

said caliper including a housing defining a bore therewithin and further including a plug within said bore, the outer circumferential surface of said plug cooperating with the wall of the bore to define an annular chamber therebetween, fastening means releasably securing said plug to said caliper, and a piston slidably mounted within said bore, said piston including an annular section and a transversely extending section closing one end of the annular section, said annular section being received within said annular chamber and slidingly and sealingly engaging the wall of the bore and the outer circumferential surface of the plug;

said annular portion of the piston cooperating with the end of the bore to define a first variable-volume chamber therebetween, said first chamber being communicated to a first fluid pressure source;

said transversely extending portion of said piston cooperating with the end of said plug to define a second variable-volume chamber therebetween, said second chamber being communicated to a second fluid pressure source;

a pair of spaced dynamic seals to prevent fluid communication between said first and second chambers through the interface between the plug and the piston;

a pair of spaced static seals disposed between the plug and the housing to prevent fluid communication through the interface between the plug and the housing;

a first fluid passage extending through said plug and communicating that portion of the interface between the piston and the plug intermediate the dynamic seals to that portion of the interface between said plug and the housing intermediate the static seals, and second passage means communicating that portion of the interface between the plug and the housing intermediate said static seals to the exterior of said housing; and detent means orienting said plug circumferentially with respect to the housing to thereby align first passage means with said second passage means.

2. The invention of claim 1:

said detent means including a pin carried by said housing and a recess in said plug receiving the pin when the plug is installed upon the housing.

* * * * *